US008964128B1

(12) United States Patent
Li

(10) Patent No.: US 8,964,128 B1
(45) Date of Patent: Feb. 24, 2015

(54) IMAGE DATA PROCESSING METHOD AND APPARATUS

(71) Applicants: Beijing Lenovo Software Ltd., Beijing (CN); Lenovo (Beijing) Co., Ltd., Beijing (CN)

(72) Inventor: Rui Li, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/230,250

(22) Filed: Mar. 31, 2014

(30) Foreign Application Priority Data

Aug. 9, 2013 (CN) .......................... 2013 1 0347509

(51) Int. Cl.
*H04N 5/44* (2011.01)
*H04N 5/225* (2006.01)
*G06F 3/01* (2006.01)
*H04N 21/4223* (2011.01)
*G06K 9/00* (2006.01)

(52) U.S. Cl.
CPC ........ *H04N 21/4223* (2013.01); *G06K 9/00355* (2013.01)
USPC ............................ 348/734; 348/169; 345/158

(58) Field of Classification Search
USPC .................. 348/169, 734, 569; 345/156–158; 715/863; 382/115, 116, 190, 195, 203, 382/216–220; 725/10, 12, 37; 455/3.06; 463/40, 30–34, 42; 340/12.22
See application file for complete search history.

(56) References Cited

U.S. PATENT DOCUMENTS

| 8,384,665 | B1* | 2/2013 | Powers et al. ................. 345/156 |
| 2010/0306713 | A1* | 12/2010 | Geisner et al. ................ 715/863 |
| 2011/0112996 | A1* | 5/2011 | Tu et al. ........................... 706/12 |
| 2011/0169866 | A1* | 7/2011 | Yoshikawa et al. ........... 345/660 |
| 2011/0237324 | A1* | 9/2011 | Clavin et al. .................... 463/29 |
| 2012/0226981 | A1* | 9/2012 | Clavin .......................... 715/719 |
| 2012/0268424 | A1* | 10/2012 | Kim et al. ..................... 345/175 |
| 2013/0010071 | A1* | 1/2013 | Valik et al. ...................... 348/46 |
| 2013/0257720 | A1* | 10/2013 | Noda et al. .................... 345/157 |
| 2013/0321271 | A1* | 12/2013 | Bychkov et al. .............. 345/158 |
| 2013/0344961 | A1* | 12/2013 | Iannetta .......................... 463/36 |
| 2014/0009384 | A1* | 1/2014 | Valik et al. .................... 345/156 |
| 2014/0173504 | A1* | 6/2014 | Gup et al. ...................... 715/784 |

\* cited by examiner

*Primary Examiner* — Victor Kostak

(74) *Attorney, Agent, or Firm* — Harness, Dickey & Pierce, P.L.C.

(57) ABSTRACT

A data processing method and a data processing apparatus applied to an electronic device are provided. The electronic device includes an acquiring unit. The data processing method includes: obtaining a first image acquired by the acquiring unit; determining a first sub image in the first image, where the first sub image corresponds to an operator; obtaining at least one second image acquired by the acquiring unit with the operator in the first sub image as a target, where each second image comprises a second sub image, and each second sub image corresponds to the operator, and where a first ratio of the first sub image in the first image is less than a second ratio of each second sub image in the corresponding second image; obtaining an operation command corresponding to the operator in at least one second sub image; and executing the operation command.

18 Claims, 7 Drawing Sheets

IMAGE DATA PROCESSING METHOD AND APPARATUS

The present application claims the priority to Chinese Patent Application No. 201310347509.9, entitled "DATA PROCESSING METHOD AND APPARATUS", filed on Aug. 9, 2013 with the Chinese State Intellectual Property Office, which is incorporated herein by reference in its entirety.

FIELD

The disclosure relates to the field of computer application technology, and particularly to a data processing method and a data processing apparatus.

BACKGROUND

Currently, in recognizing a gesture of an operator of a TV, the gesture is obtained and the recognized by providing a camera on the TV. However, in a case where the operator of the TV is far way from the TV, the recognition accuracy to the gesture is low with the existing solution since the camera for performing gesture recognition can not meet a requirement of high pixel.

SUMMARY

A data processing method and a data processing apparatus are provided in the disclosure, to solve a technical problem in the existing gesture recognition solution that commands and operations are performed with low accuracy due to low recognition accuracy.

The disclosure provides a data processing method applied to an electronic device, the data processing method includes:
  obtaining a first image acquired by an acquiring unit included in the electronic device;
  determining a first sub image in the first image, where the first sub image corresponds to an operator;
  obtaining at least one second image acquired by the acquiring unit with the operator in the first sub image as a target, where each second image includes a second sub image, and each second sub image corresponds to the operator,
  where a first ratio between the first sub image and the first image is less than a second ratio between each second sub image and the corresponding second image;
  obtaining an operation command corresponding to the operator in at least one second sub image; and
  executing the operation command.

Preferably, the second ratio between each second sub image and the corresponding second image is different, and the second ratio between each second sub image and the corresponding second image is increased with acquiring sequence of the second images by the acquiring unit.

Preferably, the obtaining at least one second image acquired by the acquiring unit with the operator in the first sub image as a target includes:
  triggering the acquiring unit to acquire the at least one second image with the operator in the first sub image as focus; and
  obtaining the at least one second image.

Preferably, the determining a first sub image in the first image includes:
  recognizing the first image, to obtain a position of the operator in the first image; and
  determining an image of a region where the operator is located as the first sub image in the first image.

Preferably, the recognizing the first image to obtain a position of the operator in the first image includes:
  scanning the first image, to obtain a skeleton of at least one operator to be selected in the first image;
  determining a target skeleton in the skeleton of the at least one operator to be selected which matches with a skeleton described by a received user operation instruction; and
  determining a position of the target skeleton as the position of the operator in the first image.

Preferably, the recognizing the first image to obtain a position of the operator in the first image includes:
  scanning the first image, to obtain a human skeleton in the first image;
  determining a target skeleton in the human skeleton which matches with a skeleton described by a received user operation instruction; and
  determining a position of the target skeleton as the position of the operator in the first image.

Preferably, the obtaining an operation command corresponding to the operator in the at least one second sub image includes:
  selecting a second sub image, wherein a ratio between the second sub image and the corresponding second image is the greatest, and the second sub image is selected in the at least one second sub image as a target sub image;
  recognizing contour data of the operator in the target sub image; and
  determining a command corresponding to the contour data as an operation command based on a preset correspondence between a command and a contour.

The disclosure further provides a data processing apparatus applied to an electronic device, and the electronic device includes an acquiring unit, the data processing apparatus includes:
  a first image obtaining unit configured to obtain a first image acquired by the acquiring unit;
  a first sub image determining unit configured to determine a first sub image in the first image, where the first sub image corresponds to an operator;
  a second image obtaining unit configured to obtain at least one second image acquired by the acquiring unit with the operator in the first sub image as a target, where each second image includes a second sub image, and each second sub image corresponds to the operator,
  where a first ratio between the first sub image in the first image is less than a second ratio between each second sub image and the corresponding second image;
  a command obtaining unit configured to obtain an operation command corresponding to the operator in at least one second sub image; and
  a command execution unit configured to execute the operation command.

Preferably, the second ratio between each second sub image and the corresponding second image is different, and the second ratio between each second sub image and the corresponding second image is increased with acquiring sequence of the second images by the acquiring unit.

Preferably, the second image obtaining unit includes:
  an acquisition triggering subunit configured to trigger the acquiring unit to acquire the at least one second image with the operator in the first sub image as focus; and
  an image obtaining subunit configured to obtain the at least one second image.

Preferably, the first sub image determining unit includes:
  an image recognition subunit configured to recognize the first image, to obtain a position of the operator in the first image; and an image determining subunit configured to determine an image of a region where the operator is located as the first sub image in the first image.

Preferably, the image recognition subunit includes:

a first scanning module configured to scan the first image, to obtain a skeleton of at least one operator to be selected in the first image;

a first skeleton determining module configured to determine a target skeleton in the skeleton of the at least one operator to be selected which matches with a skeleton described by a received user operation instruction; and a first position determining module configured to determine a position of the operator to be selected corresponding to the target skeleton as the position of the operator in the first image.

Preferably, the image recognition subunit includes:

a second scanning module configured to scan the first image, to obtain a human skeleton in the first image;

a second skeleton determining module configured to determine a target skeleton in the human skeleton which matches with a skeleton described by a received user operation instruction; and a second position determining module configured to determine a position of the target skeleton as the position of the operator in the first image.

Preferably, the command obtaining unit includes:

an image selection subunit configured to select a second sub image, wherein a ratio between the second sub image and the corresponding second image is the greatest, and the second sub image is selected in the at least one second sub image as a target sub image;

a contour recognition subunit configured to recognize contour data of the operator in the target sub image; and a command determining subunit configured to determine a command corresponding to the contour data as an operation command based on a preset correspondence between a command and a contour.

It can be known from the above solution that the disclosure provides a data processing method and a data processing apparatus. The first image acquired by an acquiring unit in an electronic device is obtained, and the first sub image in the first image corresponding to the operator is determined; multiple second images acquired by the acquiring unit with the operator in the first sub image as a target are obtained, where each second image includes a second sub image corresponding to the operator, and a first ratio between the first sub image and the first image is less than a second ratio between each second sub image and the corresponding second image; then an operation command corresponding to the operator in the at least one second sub image is obtained and is executed. In this way, an object of the disclosure is realized. In the disclosure, an image of a region where the operator is located can be obtained by zooming in, to obtain a clearer and more precise image of the operator, therefore, a corresponding operation command is obtained and executed, which improves recognition accuracy of the operator, and further improves operation accuracy.

BRIEF DESCRIPTION OF THE DRAWINGS

In order to more clearly illustrate the technical solution in the embodiments of the disclosure, in the following, accompanying drawings required in the description of the embodiments will be introduced simply. Obviously, the accompanying drawings in the following description are just some embodiments of the disclosure. For those skilled in the art, other accompanying drawings can also be obtained according to the accompanying drawings provided without any creative work.

DETAILED DESCRIPTION

In the following, the technical solution in the embodiments of the disclosure will be described clearly and completely in conjunction with the accompanying drawings in the embodiments of the disclosure. Obviously, the described embodiments are just a part of embodiments of the disclosure, and are not all embodiments. All other embodiments obtained by those skilled in the art based on the embodiments of the disclosure without any creative work will fall within the scope of protection of the disclosure.

Figure 1:
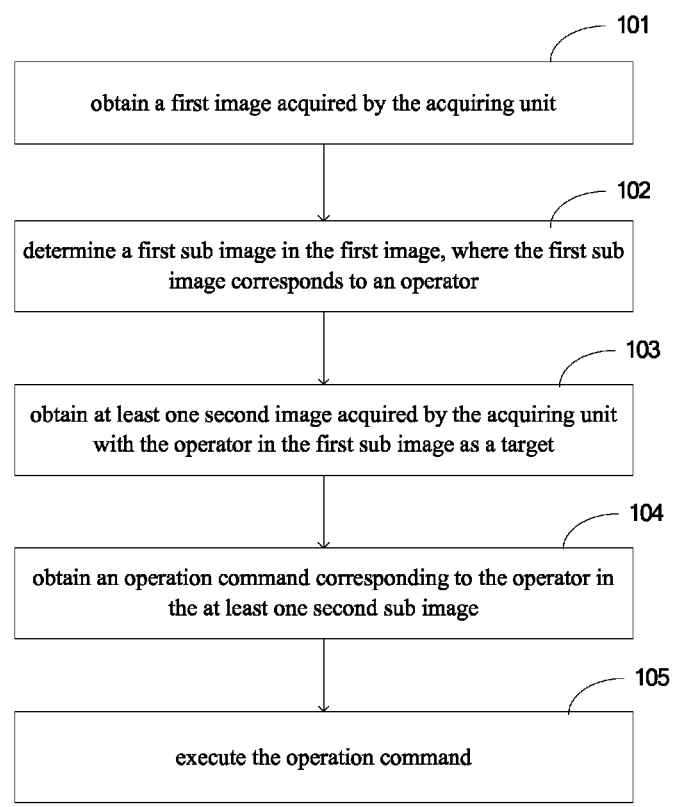
FIG. 1 is a flow chart of a data processing method according to a first embodiment of the disclosure.

Reference is made to FIG. 1 which is a flow chart of a data processing method according to a first embodiment of the disclosure. The method may be applied to an electronic device. The electronic device includes an acquiring unit, and the acquiring unit may acquire a scene image. The method may include steps 101 to 105.

Step 101 is obtaining a first image acquired by the acquiring unit.

The first image refers to a panoramic image of a scene where an operator to be recognized is located, and the operator to be recognized may be, for example, a hand, a mouth and an eyeball of a human body.

The acquiring unit may be a device capable of acquiring image data, such as a camera. The electronic device may be an apparatus including the acquiring unit, such as a TV, a computer or a pad. In a case where it is required to recognize an operator of a user and then execute a command on the electronic device, for example, content displayed in a display unit of the electronic device is triggered and clicked by the user through a hand gesture, the acquiring unit is triggered to acquire a panoramic image, i.e., a first image, of a region where the user is located, and thus the first image is obtained in the disclosure.

Step 102 is determining a first sub image in the first image, where the first sub image corresponds to an operator.

Figure 2:
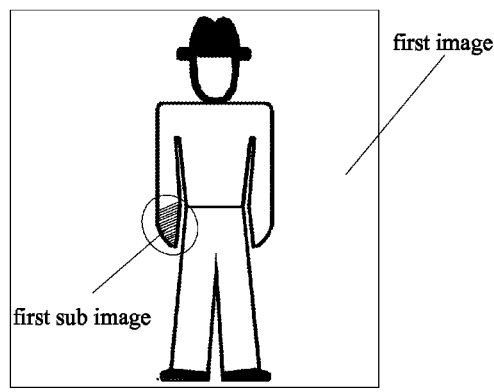
FIG. 2 is a diagram of an exemplary application according to the first embodiment of the disclosure.

The first sub image corresponding to the operator means that an image region in the first image corresponding to the operator is the first sub image, as shown in FIG. 2.

It should be illustrated that a ratio between the first sub image, i.e., the image region of the operator, and the first image is defined as a first ratio.

Step 103 is obtaining at least one second image acquired by the acquiring unit with the operator in the first sub image as a target.

Each second image includes a second sub image, and each second sub image corresponds to the operator.

Figure 3:
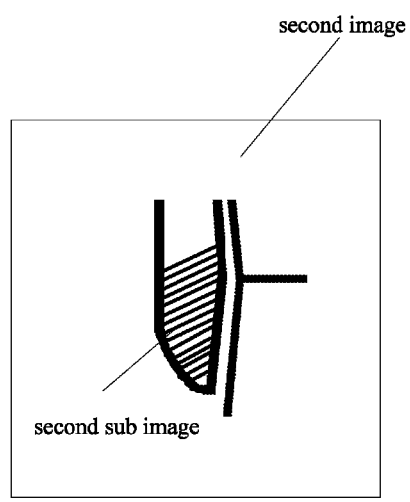
FIG. 3 is a diagram of another exemplary application according to the first embodiment of the disclosure.

It should be noted from step 103 that the second image acquired by the acquiring unit is an image including the image region of the operator. The second sub image corresponding to the operator means that the image region in the second image corresponding to the operator is a second sub image in the second image, as shown in FIG. 3.

A ratio between the second sub image, i.e., an image region of the operator and the second image, in the second image is defined as a second ratio. In the embodiment of the disclosure, each second ratio is greater than the first ratio. It should be understood that resolution and size of the first image acquired by the acquiring unit are the same as those in the second image acquired by the acquiring unit. The first ratio between the operator and the first image is less than the second ratio between the operator and each second image. The second image is an image in which a partial image including the first sub image in the first image is zoomed in by a variable times with the resolution unvaried.

The second ratio between each second sub image and the corresponding second image is different, and the second ratio between each second sub image and the corresponding second image is increased with acquiring sequence of the second images by the acquiring unit.

Step 103 may be realized as follows:

the acquiring unit is triggered to acquire the second image including the entire region of the first sub image with at least one focal length and with the operator in the first sub image as focus. Each focal length is different and is reduced with acquiring sequence of the second image, and each focal length corresponds to a second image and a second sub image thereof. The second image acquired by the acquiring unit is an image obtained by zooming in the focal length with the operator in the first sub image as a target, the second ratio between the second sub image and the second image acquired by the acquiring unit for the last time is the greatest. Then each second image is obtained in the disclosure.

In this case, the second sub image in the second image obtained in step 103 is easier to be recognized compared with the first sub image.

Step 104 is obtaining an operation command corresponding to the operator in the at least one second sub image.

It can be understood from step 104 that the intention of the user which the operator belongs to is determined based on a contour or a skeleton shape of the operator in the second sub image, and the operation command corresponding to the user intention is then determined.

Step 105 is executing the operation command.

After the operation command corresponding to the operator in the second sub image is determined in step 104, a corresponding action is performed on the content displayed by the electronic device based on the operation command, such as selecting or opening a file by clicking.

It can be known from the above solution that the first embodiment of the disclosure provides a data processing method. The first image acquired by an acquiring unit in an electronic device is obtained, and a first sub image in the first image corresponding to an operator is determined; multiple second images acquired by the acquiring unit with the operator in the first sub image as a target are obtained, where each second image includes a second sub image corresponding to the operator, and a first ratio between the first sub image and the first image is less than a second ratio between each second sub image and a corresponding second image; then an operation command corresponding to the operator in at least one second sub image is obtained and executed. In this way, an object of the disclosure is realized. In the disclosure, an image of a region where the operator is located can be obtained by zooming in, to obtain a clearer and more precise image of the operator, therefore, a corresponding operation command is obtained and executed, which improves recognition accuracy of the operator, and further improves operation accuracy.

Figure 4:
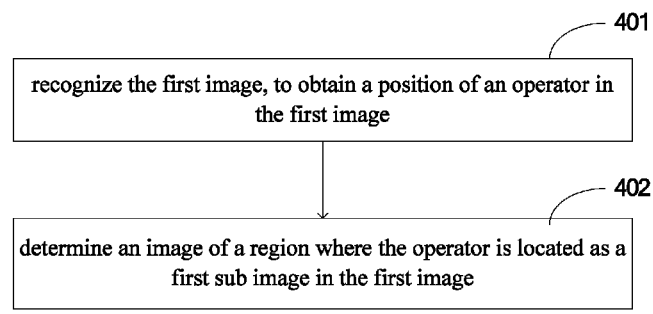
FIG. 4 is a partial flow chart of a data processing method according to a second embodiment of the disclosure.

Reference is made to FIG. 4 which is a flow chart of step 102 in a data processing method provided according to a second embodiment of the disclosure. Step 102 includes steps 401 to 402.

Step 401 is recognizing the first image, to obtain a position of the operator in the first image.

The position of the operator may be a coordinate value of a position of an absolute centre point of the operator, or may be a coordinate value of a position of an edge contour of the operator, or may be an edge coordinate value of the maximum circumcircle with the absolute center point of the operator as a center.

Figure 5:
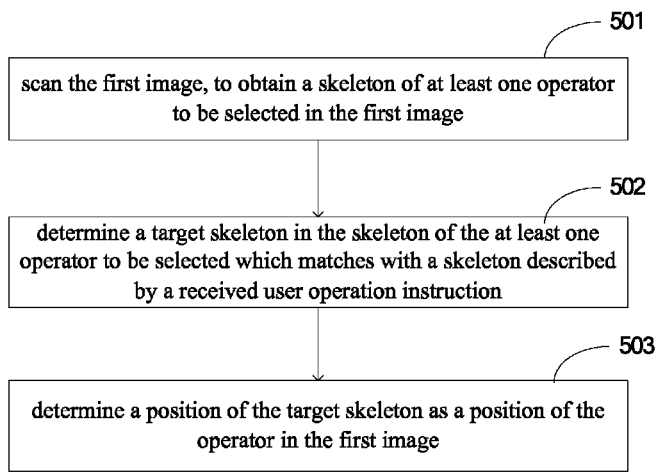
FIG. 5 is a partial flow chart of the second embodiment of the disclosure.

Reference is made to FIG. 5 which is a flow chart of step 401 according to the second embodiment of the disclosure. Step 401 may be realized by steps 501 to 503.

Step 501 is scanning the first image, to obtain a skeleton of at least one operator to be selected in the first image.

In step 501, the first image may be scanned using a two-dimensional image scanning method, and may be scanned and matched using a sample match and recognition method, to obtain the skeleton of at least one operator to be selected in the first image.

The operator to be selected may be any one of a mouth, an eyeball, a hand and a body or any combination thereof.

Step 502 is determining a target skeleton in the skeleton of the at least one operator to be selected which matches with a skeleton described by a received user operation instruction.

The user operation instruction refers to an instruction which is used to define or set a type of the operator by a user. The user operation instruction may be set by the user in advance, or may be set by the user in a process of applying the embodiment of the disclosure. Skeleton information corresponding to the type of the operator defined by the user is set in the user operation instruction.

Step 503 is determining a position of the target skeleton as a position of the operator in the first image.

The position of the target skeleton in step 503 may be the coordination value of the position of the absolute centre point of the operator, or may be the edge coordinate value of the maximum circumcircle with the absolute center point of the operator as a center, in step 401.

Figure 6:
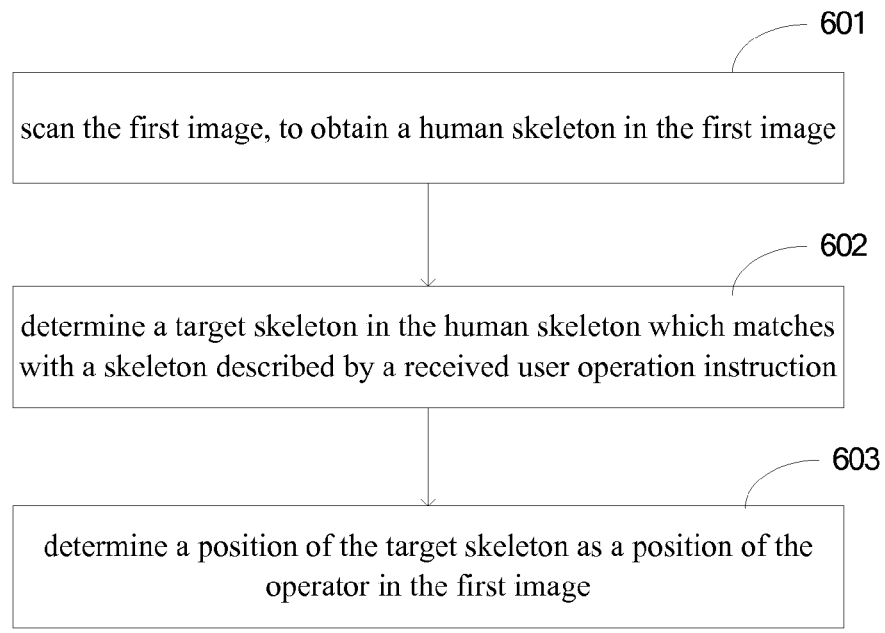
FIG. 6 is another partial flow chart of the second embodiment of the disclosure.

Reference is made to FIG. 6 which is a flow chart of step 401 according to the second embodiment of the disclosure. Step 401 may be realized by steps 601 to 603.

Step 601 is scanning the first image, to obtain a human skeleton in the first image.

Figure 7:
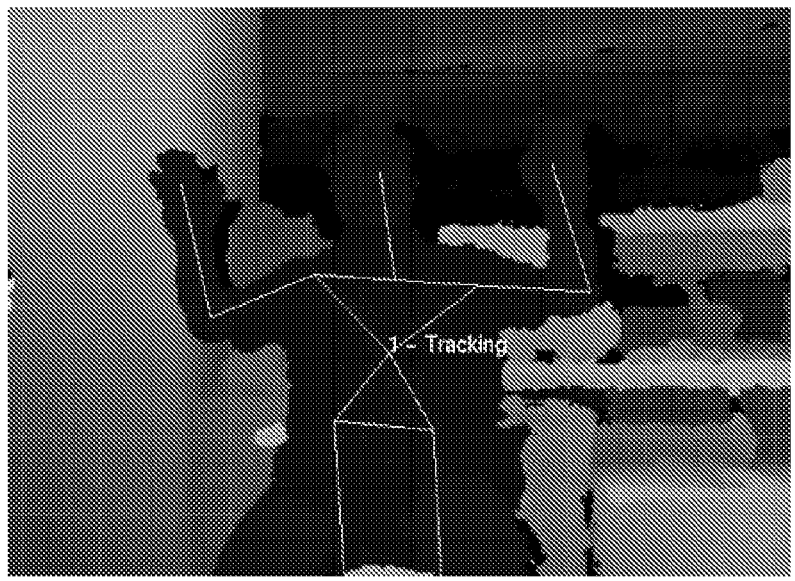
FIG. 7 is a diagram of an exemplary application according to the second embodiment of the disclosure.

In step 601, the first image may be scanned using a two-dimensional image scanning method, or may be scanned and matched using a sample match and recognition method, to obtain the human skeleton in the first image. The human skeleton may be all human skeletons or partial human skeleton including the operator skeleton, as shown in FIG. 7 (1-tracking).

Step 602 is determining a target skeleton in the human skeleton which matches with a skeleton described by a received user operation instruction.

The user operation instruction refers to an instruction which is used to define or set a type of the operator by a user. The user operation instruction may be set by the user in advance, or may be set by the user in a process of applying the embodiment of the disclosure. Skeleton information corresponding to the type of the operator defined by the user is set in the user operation instruction.

It should be illustrated that in step 602, the target skeleton in the human skeleton which matches with the skeleton in the user operation instruction may be determined in a gradually matching manner.

Step 603 is determining a position of the target skeleton as the position of the operator in the first image.

The position of the target skeleton in step 603 may be the coordination value of the position of the absolute centre point of the operator, or may be the edge coordinate value of the maximum circumcircle with the absolute center point of the operator as a center, in step 401.

Step 402 is determining an image of a region where the operator is located as a first sub image in the first image.

The first sub image in step 402 includes an image consisting of pixels corresponding to the position of the operator including an edge contour of the operator.

Figure 8:
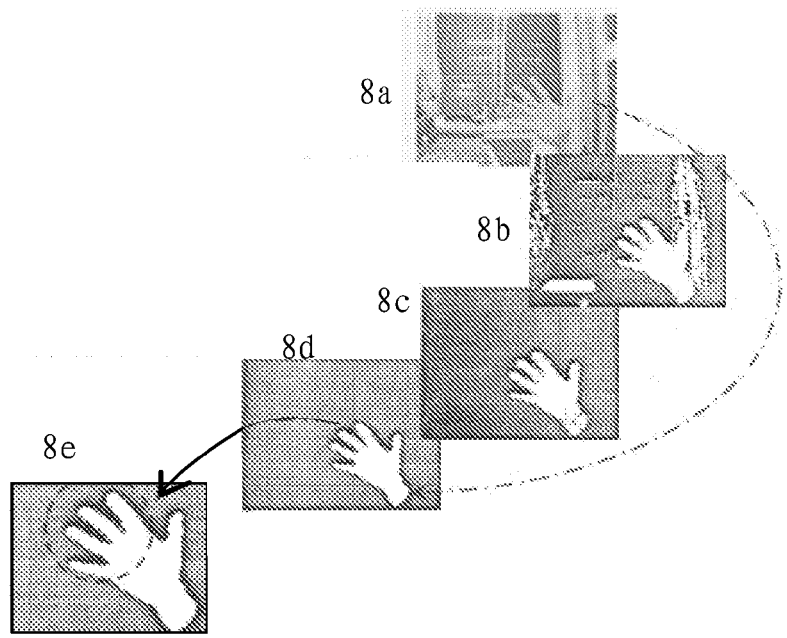
FIG. 8 is a diagram of another exemplary application according to the second embodiment of the disclosure.

FIG. 8 is taken as an example. FIG. 8a shows an obtained first image which is a panoramic image including a palm image. After the first image is obtained, a first sub image, i.e., the palm image, in the first image is determined as shown in FIGS. 8b to 8d. After the first sub image is determined, a second image including the palm image in the first sub image is obtained. As shown in FIG. 8e, the second image includes a second sub image corresponding to the palm, and the second ratio is greater than the first ratio. That is, compared with the first sub image in the first image, the second sub image in the second image is larger, relatively clearer, and easier to be recognized.

Figure 9:
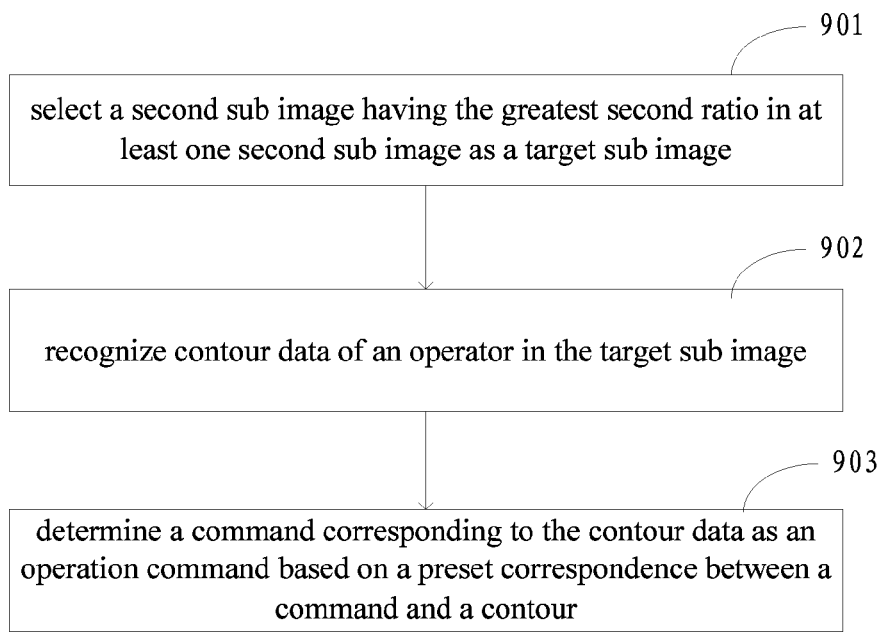
FIG. 9 is a partial flow chart of a data processing method according to the third embodiment of the disclosure.

Reference is made to FIG. 9 which is a flow chart of step 104 in a data processing method according to a third embodiment of the disclosure. Step 104 may be realized by steps 901 to 903.

Step 901 is selecting a second sub image, wherein a ratio between the second sub image and the corresponding second image is the greatest, and the second sub image is selected in at least one second sub image as a target sub image.

It should be illustrated that the second ratio between the second sub image and the second image being the greatest means that the second sub image in the second image is the clearest, and the accuracy of determining the operator command later is high.

Step 902 is recognizing contour data of an operator in the target sub image.

The contour data of the operator in the target sub image may be recognized by using, for example, a two-dimensional image scanning method in step 902.

Step 903 is determining a command corresponding to the contour data as an operation command based on a preset correspondence between a command and a contour.

The correspondence between a command and a contour may be set by the user in advance. Each contour data corresponds to an operation command of an operator gesture corresponding to the contour data. Thus, after the contour data of the operator is recognized, an operation command corresponding to the contour data is determined, and the operation command is then executed, which realizes the object of the disclosure.

Figure 10:
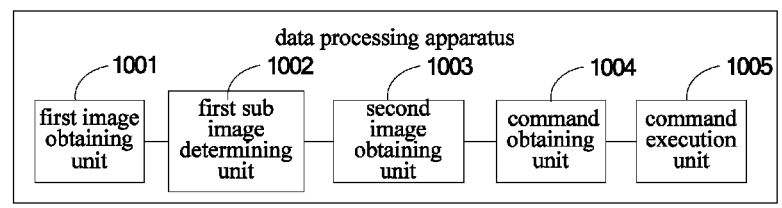
FIG. 10 is a schematic structural diagram of a data processing apparatus according to a fourth embodiment of the disclosure.

Reference is made to FIG. 10 which is a schematic structural diagram of a data processing apparatus according to a fourth embodiment of the disclosure. The data processing apparatus is applied to an electronic device. The electronic device includes an acquiring unit, and the acquiring unit is configured to acquire a scene image. The data processing apparatus may include a first image obtaining unit 1001, a first sub image determining unit 1002, a second image obtaining unit 1003, a command obtaining unit 1004 and a command execution unit 1005.

The first image obtaining unit 1001 is configured to obtain a first image acquired by the acquiring unit.

The first image refers to a panoramic image of a scene where an operator to be recognized is located, and the operator to be recognized may be, for example, a hand, a mouth and an eyeball of a human body.

The acquiring unit may be a device capable of acquiring image data, such as a camera. The electronic device may be an apparatus including the acquiring unit, such as a TV, a computer or a pad. In a case where it is required to recognize an operator of a user and then execute a command on the electronic device, for example, content displayed in a display unit of the electronic device is triggered and clicked by the user through a hand gesture, the acquiring unit is triggered to acquire a panoramic image, i.e., a first image, of a region where the user is located, and thus the first image is obtained in the disclosure.

The first sub image determining unit 1002 is configured to determine a first sub image in the first image, where the first sub image corresponds to an operator.

The first sub image corresponding to the operator means that an image region in the first image corresponding to the operator is the first sub image, as shown in FIG. 2.

It should be illustrated that a ratio between the first sub image, i.e., the image region of the operator, and the first image is defined as a first ratio.

The second image obtaining unit 1003 is configured to obtain at least one second image acquired by the acquiring unit with the operator in the first sub image as a target.

Each second image includes a second sub image, and each second sub image corresponds to the operator.

It should be noted from the second image obtaining unit 1003 that the second image acquired by the acquiring unit is an image including the image region of the operator. The second sub image corresponding to the operator means that the image region in the second image corresponding to the operator is a second sub image in the second image, as shown in FIG. 3.

A ratio between the second sub image, i.e., an image region of the operator in the second image, and the second image is defined as a second ratio. In the embodiment of the disclosure, each second ratio is greater than the first ratio. It should be understood that resolution and size of the first image acquired by the acquiring unit are the same as those in the second image acquired by the acquiring unit. The first ratio between the operator and the first image is less than the second ratio between the operator and each second image. The second image is an image in which a partial image including the first sub image in the first image is zoomed in by a variable times with the resolution unvaried.

The second ratio between each second sub image and the corresponding second image is different, and the second ratio between each second sub image and the corresponding second image is increased with acquiring sequence of the second images by the acquiring unit.

Figure 11:
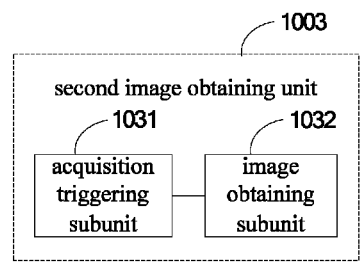
FIG. 11 is a partial schematic structural diagram of a fourth embodiment of the disclosure.

Reference is made to FIG. 11 which is a schematic structural diagram of the second image obtaining unit 1003 according to the fourth embodiment of the disclosure. The second image obtaining unit 1003 may includes an acquisition triggering subunit 1031 and an image obtaining subunit 1032.

The acquisition triggering subunit 1031 is configured to trigger the acquiring unit to acquire at least one second image with the operator in the first sub image as focus.

It can be understood from the acquisition triggering subunit 1031 that the acquiring unit is triggered to acquire the second image including the entire region of the first sub image with at least one focal length and with the operator in the first sub image as focus. Each focal length is different and is reduced with acquiring sequence of the second image, and each focal length corresponds to a second image and a second sub image thereof. The second image acquired by the acquiring unit is an image obtained by zooming in the focal length with the operator in the first sub image as a target, the second ratio between the second sub image and the second image acquired by the acquiring unit for the last time is the greatest.

The image obtaining subunit 1032 is configured to obtain each second image.

After the acquiring unit is triggered by the acquisition triggering subunit 1031 to obtain the second image, each second image is obtained by the image obtaining subunit 1032.

In this case, the second sub image in the second image obtained by the second image obtaining unit 1003 is easier to be recognized compared with the first sub image.

The command obtaining unit 1004 is configured to obtain an operation command corresponding to the operator in the at least one second sub image.

It can be understood from the command obtaining unit 1004 that the intention of the user which the operator belongs to is determined based on a contour or a skeleton shape of the operator in the second sub image, and the operation command corresponding to the user intention is then determined.

The command execution unit 1005 is configured to execute the operation command.

After the operation command corresponding to the operator in the second sub image is determined by the command obtaining unit 1004, a corresponding action is performed on the content displayed by the electronic device by the command execution unit 1005 based on the operation command, such as selecting or opening a file by clicking.

It can be known from the above solution that the fourth embodiment of the disclosure provides a data processing apparatus. The first image acquired by an acquiring unit in an electronic device is obtained, and a first sub image in the first image corresponding to an operator is determined; multiple second images acquired by the acquiring unit with the operator in the first sub image as a target are obtained, where each second image includes a second sub image corresponding to the operator, and a first ratio between the first sub image and the first image is less than a second ratio between each second sub image and a corresponding second image; then an operation command corresponding to the operator in at least one second sub image is obtained and executed. In this way, an object of the disclosure is realized. In the disclosure, an image of a region where the operator is located can be obtained by zooming in, to obtain a clearer and more precise image of the operator, therefore, a corresponding operation command is obtained and executed, which improves recognition accuracy of the operator, and further improves operation accuracy.

Figure 12:
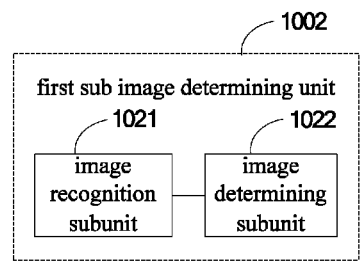
FIG. 12 is a partial schematic structural diagram of a data processing apparatus according to a fifth embodiment of the disclosure.

Reference is made to FIG. 12 which is a schematic structural diagram of the first sub image determining unit 1002 in the data processing apparatus according to a fifth embodiment of the disclosure. The first sub image determining unit 1002 may include an image recognition subunit 1021 and an image determining subunit 1022.

The image recognition subunit 1021 is configured to recognize the first image, to obtain a position of an operator in the first image.

The position of the operator may be a coordinate value of a position of an absolute centre point of the operator, or may be a coordinate value of a position of an edge contour of the operator, or may be an edge coordinate value of the maximum circumcircle with the absolute center point of the operator as a center.

Figure 13:
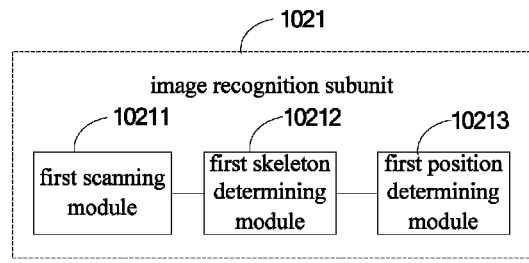
FIG. 13 is a partial schematic structural diagram of the fifth embodiment of the disclosure.

Reference is made to FIG. 13 which is a schematic structural diagram of the image recognition subunit 1021 according to the fifth embodiment of the disclosure. The image recognition subunit 1021 may include a first scanning module 10211, a first skeleton determining module 10212 and a first position determining module 10213.

The first scanning module 10211 is configured to scan the first image, to obtain a skeleton of at least one operation to be selected in the first image.

The first scanning module 10211 may scan the first image using a two-dimensional image scanning method, or may scan and match the first image using a sample match and recognition method, to obtain the skeleton of at least one operation to be selected in the first image.

The operator to be selected may be any one of a mouth, an eyeball, a hand and a body or any combination thereof.

The first skeleton determining module 10212 is configured to determine a target skeleton in the skeleton of the operator to be selected which matches with a skeleton described by a received user operation instruction.

The user operation instruction refers to an instruction which is used to define or set a type of the operator by a user. The user operation instruction may be set by the user in advance, or may be set by the user in a process of applying the embodiment of the disclosure. Skeleton information corresponding to the type of the operator defined by the user is set in the user operation instruction.

The first position determining module 10213 is configured to determine a position of the operator to be selected corresponding to the target skeleton as a position of the operator in the first image.

The position of the target skeleton used in the first position determining module 10213 may be the coordination value of the position of the absolute centre point of the operator, or may be the edge coordinate value of the maximum circumcircle with the absolute center point of the operator as a center, used in the image recognition subunit 1021.

Figure 14:
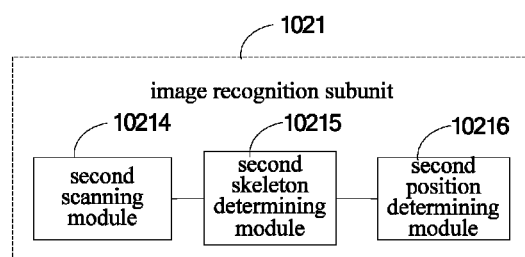
FIG. 14 is another partial schematic structural diagram of the fifth embodiment of the disclosure.

Reference is made to FIG. 14 which is another schematic structural diagram of the image recognition subunit 1021 according to the fifth embodiment of the disclosure. The image recognition subunit 1021 may include a second scanning module 10214, a second skeleton determining module 10215 and a second position determining module 10216.

The second scanning module 10214 is configured to scan the first image, to obtain a human skeleton in the first image.

The second scanning module 10214 may scan the first image using a two-dimensional image scanning method, or may scan and match the first image using a sample match and recognition method, to obtain the human skeleton in the first image. The human skeleton may be all human skeletons or a partial human skeleton including an operator skeleton, as shown in FIG. 7.

The second skeleton determining module 10215 is configured to determine a target skeleton in the human skeleton which matches with a skeleton described by a received user operation instruction.

The user operation instruction refers to an instruction which is used to define or set a type of the operator by a user. The user operation instruction may be set by the user in advance, or may be set by the user in a process of applying the embodiment of the disclosure. Skeleton information corresponding to the type of the operator defined by the user is set in the user operation instruction.

It should be illustrated that the second skeleton determining module 10215 may determine the target skeleton in the human skeleton which matches with the skeleton in the user operation instruction in a gradually matching manner.

The second position determining module 10216 is configured to determine a position of the target skeleton as the position of the operator in the first image.

The position of the target skeleton used in the second position determining module 10216 may be the coordination value of the position of the absolute centre point of the operator, or may be the edge coordinate value of the maximum circumcircle with the absolute center point of the operator as a center, used in the image determining subunit 1022.

The image determining subunit 1022 is configured to determine an image of a region where the operator is located as a first sub image in the first image.

The first sub image used in the image determining subunit 1022 includes an image consisting of pixels corresponding to the position of the operator including an edge contour of the operator.

FIG. 8 is taken as an example. FIG. 8a shows an obtained first image which is a panoramic image including a palm image. After the first image is obtained, a first sub image, i.e., the palm image, in the first image is determined as shown in FIGS. 8b to 8d. After the first sub image is determined, a second image including the palm image in the first sub image is obtained. As shown in the small block of FIG. 8e, the second image includes a second sub image corresponding to the palm, and the second ratio is greater than the first ratio. That is, compared with the first sub image in the first image, the second sub image in the second image is larger, relatively clearer, and easier to be recognized.

Figure 15:
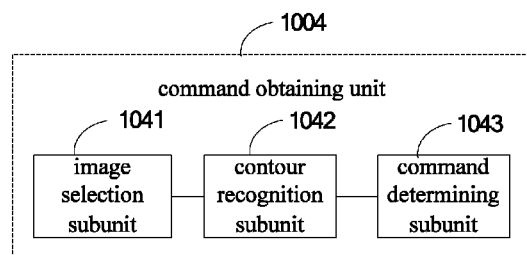
FIG. 15 is a partial schematic structural diagram of a data processing apparatus according to a sixth embodiment of the disclosure.

Reference is made to FIG. 15 which is a schematic structural diagram of the command obtaining unit 1004 in a data processing apparatus according to a sixth embodiment provided by the disclosure. The command obtaining unit 1004 may include an image selection subunit 1041, a contour recognition subunit 1042 and a command determining subunit 1043.

The image selection subunit 1041 is configured to select a second sub image, wherein a ratio between the second sub image and the corresponding second image is the greatest, and the second sub image is selected in at least one second sub image as a target sub image.

It should be illustrated that the second ratio between the second sub image and the second image being the greatest means that the second sub image in the second image is the clearest, and the accuracy of determining the operator command later is high.

The contour recognition subunit 1042 is configured to recognize contour data of the operator in the target sub image.

The contour recognition subunit 1042 may recognize the contour data of the operator in the target sub image by using, for example, a two-dimensional image scanning method.

The command determining subunit 1043 is configured to determine a command corresponding to the contour data as an operation command based on a preset correspondence between a command and a contour.

The correspondence between a command and a contour may be set by the user in advance. Each contour data corresponds to an operation command of an operator gesture corresponding to the contour data. Thus, after the contour data of the operator is recognized, an operation command corresponding to the contour data is determined, and the operation command is then executed, which realizes the object of the disclosure.

The various embodiments in this specification are described herein in a progressive manner, with the emphasis of each of the embodiments on the difference between it and the other embodiment; hence, for the same or similar parts between the various embodiments, one can refer to the other embodiments.

Finally, it should also be illustrated that a relationship term such as "the first" and "the second" herein is only used to distinguish one entity or operation from another entity or operation, and does not necessarily require or imply that there is an actual relationship or sequence between these entities or operations. Furthermore, terms "include", "comprise" or any other variations are intended to cover non-exclusive "include", so that a process, a method, an object or a device including a series of factors not only include the factors, but also include other factors not explicitly listed, or also include inherent factors of the process, the method, the object or the device. Without more limitation, a factor defined in a sentence "include one . . . " does not exclude a case that there is also another same factor in the process, the method, the object or the device including the described factor.

A data processing method and a data processing apparatus provided by the disclosure are introduced in detail above, the principle and the embodiments of the disclosure are summed by applying a specific example, and the above embodiments are illustrated to assist in understanding the method of the disclosure and a core concept thereof. Meanwhile, for those skilled in the art, the specific embodiment and the application scope can be altered according to the concept of the disclosure, therefore, the content of the specification is not understood to limit the disclosure.

The invention claimed is:

1. A data processing method, which is applied to an electronic device, the data processing method comprises:
    obtaining a first image acquired by an acquiring unit comprised in the electronic device;
    determining a first sub image in the first image, wherein the first sub image corresponds to an operator;
    obtaining at least one second image acquired by the acquiring unit with the operator in the first sub image as a target, wherein each second image comprises a second sub image, and each second sub image corresponds to the operator,
    wherein a first ratio between the first sub image and the first image is less than a second ratio between each second sub image and the corresponding second image;
    obtaining an operation command corresponding to the operator in at least one second sub image; and
    executing the operation command.

2. The method according to claim 1, wherein the second ratio between each second sub image and the corresponding second image is different, and the second ratio between each second sub image and the corresponding second image is increased with acquiring sequence of the second images by the acquiring unit.

3. The method according to claim 1, wherein the obtaining at least one second image acquired by the acquiring unit with the operator in the first sub image as a target comprises:
triggering the acquiring unit to acquire the at least one second image with the operator in the first sub image as focus; and
obtaining the at least one second image.

4. The method according to claim 1, wherein the determining a first sub image in the first image comprises:
recognizing the first image, to obtain a position of the operator in the first image; and
determining an image of a region where the operator is located as the first sub image in the first image.

5. The method according to claim 3, wherein the determining a first sub image in the first image comprises:
recognizing the first image, to obtain a position of the operator in the first image; and
determining an image of a region where the operator is located as the first sub image in the first image.

6. The method according to claim 4, wherein the recognizing the first image to obtain a position of the operator in the first image comprises:
scanning the first image, to obtain a skeleton of at least one operator to be selected in the first image;
determining a target skeleton in the skeleton of the at least one operator to be selected which matches with a skeleton described by a received user operation instruction; and
determining a position of the target skeleton as the position of the operator in the first image.

7. The method according to claim 4, wherein the recognizing the first image to obtain a position of the operator in the first image comprises:
scanning the first image, to obtain a human skeleton in the first image;
determining a target skeleton in the human skeleton which matches with a skeleton described by a received user operation instruction; and
determining a position of the target skeleton as the position of the operator in the first image.

8. The method according to claim 1, wherein the obtaining an operation command corresponding to the operator in the at least one second sub image comprises:
selecting a second sub image, wherein a ratio between the second sub image and the corresponding second image is the greatest, and the second sub image is selected in the at least one second sub image as a target sub image;
recognizing contour data of the operator in the target sub image; and
determining a command corresponding to the contour data as an operation command based on a preset correspondence between a command and a contour.

9. The method according to claim 3, wherein the obtaining an operation command corresponding to the operator in the at least one second sub image comprises:
selecting a second sub image, wherein a ratio between the second sub image and the corresponding second image is the greatest, and the second sub image is selected in the at least one second sub image as a target sub image;
recognizing contour data of the operator in the target sub image; and
determining a command corresponding to the contour data as an operation command based on a preset correspondence between a command and a contour.

10. A data processing apparatus, which is applied to an electronic device, wherein the electronic device comprises an acquiring unit, the data processing apparatus comprises:
a first image obtaining unit configured to obtain a first image acquired by the acquiring unit;
a first sub image determining unit configured to determine a first sub image in the first image, wherein the first sub image corresponds to an operator;
a second image obtaining unit configured to obtain at least one second image acquired by the acquiring unit with the operator in the first sub image as a target, wherein each second image comprises a second sub image, and each second sub image corresponds to the operator,
wherein a first ratio between the first sub image and the first image is less than a second ratio between each second sub image and the corresponding second image;
a command obtaining unit configured to obtain an operation command corresponding to the operator in at least one second sub image; and
a command execution unit configured to execute the operation command.

11. The apparatus according to claim 10, wherein the second ratio between each second sub image and the corresponding second image is different, and the second ratio between each second sub image and the corresponding second image is increased with acquiring sequence of the second images by the acquiring unit.

12. The apparatus according to claim 10, wherein the second image obtaining unit comprises:
an acquisition triggering subunit configured to trigger the acquiring unit to acquire the at least one second image with the operator in the first sub image as focus; and
an image obtaining subunit configured to obtain the at least one second image.

13. The apparatus according to claim 10, wherein the first sub image determining unit comprises:
an image recognition subunit configured to recognize the first image, to obtain a position of the operator in the first image; and
an image determining subunit configured to determine an image of a region where the operator is located as the first sub image in the first image.

14. The apparatus according to claim 12, wherein the first sub image determining unit comprises:
an image recognition subunit configured to recognize the first image, to obtain a position of the operator in the first image; and
an image determining subunit configured to determine an image of a region where the operator is located as the first sub image in the first image.

15. The apparatus according to claim 13, wherein the image recognition subunit comprises:
a first scanning module configured to scan the first image, to obtain a skeleton of at least one operator to be selected in the first image;
a first skeleton determining module configured to determine a target skeleton in the skeleton of the at least one operator to be selected which matches with a skeleton described by a received user operation instruction; and
a first position determining module configured to determine a position of the operator to be selected corresponding to the target skeleton as the position of the operator in the first image.

16. The apparatus according to claim 13, wherein the image recognition subunit comprises:
- a second scanning module configured to scan the first image, to obtain a human skeleton in the first image;
- a second skeleton determining module configured to determine a target skeleton in the human skeleton which matches with a skeleton described by a received user operation instruction; and
- a second position determining module configured to determine a position of the target skeleton as the position of the operator in the first image.

17. The apparatus according to claim 10, wherein the command obtaining unit comprises:
- an image selection subunit configured to select a second sub image, wherein a ratio between the second sub image and the corresponding second image is the greatest, and the second sub image is selected in the at least one second sub image as a target sub image;
- a contour recognition subunit configured to recognize contour data of the operator in the target sub image; and
- a command determining subunit configured to determine a command corresponding to the contour data as an operation command based on a preset correspondence between a command and a contour.

18. The apparatus according to claim 12, wherein the command obtaining unit comprises:
- an image selection subunit configured to select a second sub image, wherein a ratio between the second sub image and the corresponding second image is the greatest, and the second sub image is selected in the at least one second sub image as a target sub image;
- a contour recognition subunit configured to recognize contour data of the operator in the target sub image; and
- a command determining subunit configured to determine a command corresponding to the contour data as an operation command based on a preset correspondence between a command and a contour.

* * * * *